(12) United States Patent
Sakai

(10) Patent No.: US 12,716,374 B2
(45) Date of Patent: Aug. 25, 2026

(54) HONEYCOMB STRUCTURE, ELECTRICALLY HEATING SUPPORT, AND EXHAUST GAS PURIFICATION DEVICE

(71) Applicant: NGK Insulators, Ltd., Nagoya-City (JP)

(72) Inventor: Naoki Sakai, Nagoya-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 734 days.

(21) Appl. No.: 18/164,755

(22) Filed: Feb. 6, 2023

(65) Prior Publication Data

US 2023/0304429 A1 Sep. 28, 2023

(30) Foreign Application Priority Data

Mar. 24, 2022 (JP) ................................ 2022-048959

(51) Int. Cl.

*F01N 3/20* (2006.01)
*F01N 3/28* (2006.01)
*B01J 35/33* (2024.01)
*B01J 35/66* (2024.01)

(52) U.S. Cl.

CPC ......... *F01N 3/2026* (2013.01); *F01N 3/2828* (2013.01); *B01J 35/33* (2024.01); *B01J 35/66* (2024.01)

(58) Field of Classification Search

None
See application file for complete search history.

(56) References Cited

U.S. PATENT DOCUMENTS 6,942,712 B2 * 9/2005 Hamanaka ............. B01D 39/20 55/529
2006/0101747 A1 * 5/2006 Masukawa ............ F01N 3/0222 52/302.1
2013/0019579 A1 * 1/2013 Okazaki ............. B01D 46/2429 264/177.12
2015/0030510 A1 * 1/2015 Mase ................. B01D 53/8678 422/180
2015/0260066 A1 9/2015 Hosoi et al.

FOREIGN PATENT DOCUMENTS

JP 2015-174011 A 10/2015

* cited by examiner

*Primary Examiner* — Jelitza M Perez
(74) *Attorney, Agent, or Firm* — Muncy, Geissler, Olds & Lowe, P.C.

(57) ABSTRACT

A honeycomb structure includes: a honeycomb structure portion including: an outer peripheral wall; a partition wall disposed on an inner side of the outer peripheral wall, the partition wall defining a plurality of cells, each of the cells extending from one end face to other end face to form a flow path, wherein the outer peripheral wall and/or the cells include at least one slit containing a filling material layer made of a filling material, wherein the filling material layer has pores, and wherein the pores having a pore diameter of 90 μm or more account for 30% by volume or more of all the pores contained in the filling material layer.

8 Claims, 3 Drawing Sheets

HONEYCOMB STRUCTURE, ELECTRICALLY HEATING SUPPORT, AND EXHAUST GAS PURIFICATION DEVICE

CROSS REFERENCE TO RELATED APPLICATIONS

The present invention claims the benefit of priority to Japanese Patent Application No 2022-048959 filed on Mar. 24, 2022 with the Japanese Patent Office, the entire contents of which are incorporated herein by reference in its entirety.

FIELD OF THE INVENTION

The present invention relates to a honeycomb structure, an electrically heating support, and an exhaust gas purification device.

BACKGROUND OF THE INVENTION

Recently, electrically heated catalysts (EHCs) have been proposed to improve a decrease in exhaust gas purification performance immediately after engine starting. For example, the EHC is configured to connect metal electrodes to a pillar shaped honeycomb structure made of conductive ceramics, and conducting a current to heat the honeycomb structure itself, thereby enabling a temperature to be increased to an activation temperature of the catalyst prior to the engine starting.

Since the EHCs are subjected to heat and/or impact from an engine, they are required to have good thermal shock resistance. If cracks are generated in the honeycomb structure of the EHC due to heat and/or impact from the engine, the energization passage in the honeycomb structure is changed and localized heat is generated, resulting in degradation of the catalyst. Further, the energization resistance increases, which will be difficult to control the current flow. As a result, an exhaust gas purification efficiency of the EHC may be deteriorated.

A technique for forming slits for stress relaxation in the honeycomb structure is known in order to suppress cracks generated in the honeycomb structure of EHC. Further, Patent Literature 1 discloses a technique for filling a stress relaxation slit of a honeycomb structure with a filling material.

CITATION LIST

Patent Literature

[Patent Literature 1] Japanese Patent Application Publication No. 2015-174011 A

SUMMARY OF THE INVENTION

However, as a result of intensive studies, the present inventors have found that an excessively high Young's modulus of the filling material filled in the slits would make it difficult to deform due to the slits for stress relaxation. They have found that this results in excessively large stress generated at positions other than the slits, so that cracks may be generated in the honeycomb structure of the EHC, and there is room for improvement.

The present invention has been made in view of the above circumstances. An object of the present invention is to provide a honeycomb structure, an electrically heating support, and an exhaust gas purification device, which have improved thermal shock resistance.

The above problems are solved by the following present invention, and the present invention is specified as follows:

(1)

A honeycomb structure, comprising:

a honeycomb structure portion comprising: an outer peripheral wall; a partition wall disposed on an inner side of the outer peripheral wall, the partition wall defining a plurality of cells, each of the cells extending from one end face to other end face to form a flow path, wherein the outer peripheral wall and/or the cells comprise at least one slit containing a filling material layer made of a filling material, wherein the filling material layer has pores, and wherein the pores having a pore diameter of 90 μm or more account for 30% by volume or more of all the pores contained in the filling material layer.

(2)

The honeycomb structure according to (1), further comprising a pair of electrode layers provided on an outer surface of the outer peripheral wall so as to extend in a form of a band in a flow path direction of the cells across a central axis of the honeycomb structure portion.

(3)

An electrically heating support comprising:

the honeycomb structure according to (2); and metal electrodes electrically connected to the electrode layers of the honeycomb structure.

(4)

An exhaust gas purification device, comprising:

the electrically heating support according to (3); and a metallic cylindrical member for holding the electrically heating support.

According to the present invention, it is possible to provide a honeycomb structure, an electrically heating support, and an exhaust gas purification device, which have improved thermal shock resistance.

DETAILED DESCRIPTION OF THE INVENTION

Hereinafter, embodiments according to the present invention will be specifically described with reference to the drawings. It is to understand that the present invention is not limited to the following embodiments, and various design modifications and improvements may be made based on ordinary knowledge of one of ordinary skill in the art, without departing from the spirit of the present invention.

(1. Honeycomb Structure)

Figure 1:
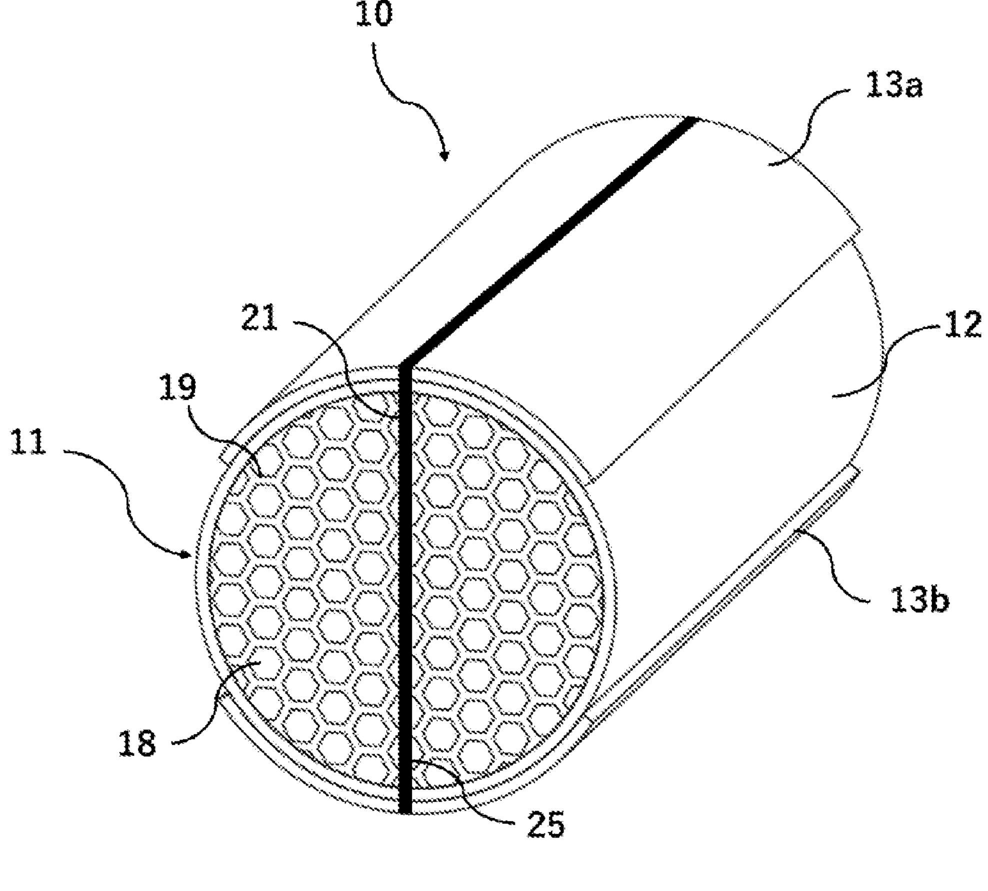
FIG. 1 is a schematic external view of a honeycomb structure according to an embodiment of the present invention.

FIG. 1 is a schematic external view of a honeycomb structure 10 according to an embodiment of the present invention. The honeycomb structure 10 includes a honeycomb structure portion 11 and electrode layers 13_a_, 13_b_. It should be noted that the honeycomb structure 10 may not include the electrode layers 13*a*, 13*b*.

(1-1. Honeycomb Structure Portion)

The honeycomb structure partition 11 is a pillar shaped member, and includes: an outer peripheral wall 12; and a partition wall 19 which is disposed on an inner side of the outer peripheral wall 12 and defines a plurality of cells 18 each extending from one end face to other end face to form a flow path. The pillar shape is understandable as a three-dimensional shape having a thickness in a flow path direction of the cells 18 (an axial direction of the honeycomb structure 11). A ratio (aspect ratio) of an axial length of the honeycomb structure 11 and a diameter or width of an end face of the honeycomb structure 11 is arbitrary. The pillar shape may also include a shape (flat shape) in which the length of the honeycomb structure portion 11 in the axial direction is shorter than the diameter or width of the end face.

An outer shape of the honeycomb structure portion 11 is not particularly limited as long as it is pillar shaped. For example, the honeycomb structure portion can have a shape such as a pillar shape with circular end faces (cylindrical shape), a pillar shaped with oval end faces, and a pillar shape with polygonal (quadrangular, pentagonal, hexagonal, heptagonal, octagonal, etc.) end faces. The size of the honeycomb structure portion 11 is such that an area of the end faces is preferably from 2000 to 20000 mm$^2$, and more preferably from 5000 to 15000 mm$^2$, for the purpose of improving heat resistance (suppressing cracks entering the outer peripheral wall in a circumferential direction).

The honeycomb structure portion 11 is made of ceramics and has electrical conductivity. A volume resistivity of the ceramics is not particularly limited as long as the conductive honeycomb structure portion 11 can be energized to generate heat by Joule heat, but it may preferably be 0.1 to 200 Ωcm, and more preferably 1 to 200 Ωcm. The volume resistivity of the honeycomb structure portion 11 is a value measured at 25° C. by a four-terminal method.

The honeycomb structure portion 11 is made of a material selected from the group consisting of oxide ceramics such as alumina, mullite, zirconia and cordierite, and non-oxide ceramics such as silicon carbide, silicon nitride and aluminum nitride, although not limited thereto. Silicon carbide-metal silicon composite materials and silicon carbide/graphite composite materials may also be used. Among them, the material of the honeycomb structure portion 11 preferably contains ceramics mainly based on the silicon-silicon carbide composite material or on silicon carbide, in terms of achieving both heat resistant and electrical conductivity. The phrase "the honeycomb structure portion 11 is mainly based on a silicone-silicon carbide composite material" as used herein means that the honeycomb structure portion 11 contains 90% by mass or more of the silicon-silicon carbide composite material (total mass) based on the entire honeycomb structure portion 11. Here, the silicon-silicon carbide composite material contains silicon carbide particles as an aggregate and silicon as a bonding material for bonding the silicon carbide particles, and a plurality of silicon carbide particles are preferably bonded by silicon so as to form pores between the silicon carbide particles. The phrase "the honeycomb structure portion 11 is mainly based on silicon carbide" as used herein means that the honeycomb structure portion 11 contains 90% by mass or more of the silicon carbide (total mass) based on the entire honeycomb structure portion 11.

When the honeycomb structure portion 11 contains the silicon-silicon carbide composite material, a ratio of a "mass of silicon as a bonding material" contained in the honeycomb structure portion 11 to the total of a "mass of silicon carbide particles as an aggregate" contained in the honeycomb structure portion 11 and a "mass of silicon as a bonding material" contained in the honeycomb structure portion 11 is preferably from 10 to 40% by mass, and more preferably from 15 to 35% by mass.

A shape of each cell in a cross section perpendicular to a flow path direction of the cells 18 is not limited, but it is preferably a quadrangle, a hexagon, an octagon, or a combination thereof. Among these, the quadrangle and the hexagon are preferred, in terms of easily achieving both structural strength and heating uniformity.

The partition wall 19 defining the cells 18 preferably has a thickness of from 0.1 to 0.3 mm, and more preferably from 0.1 to 0.2 mm. As used herein, the thickness of the partition wall 19 is defined as a length of a portion passing through the partition wall 19, among line segments connecting centers of gravity of the adjacent cells 18 in the cross section perpendicular to the flow path direction of the cells 18.

The honeycomb structure portion 11 preferably has a cell density of from 40 to 150 cells/cm$^2$, and more preferably from 70 to 100 cells/cm$^2$, in the cross section perpendicular to the flow path direction of the cells 18. The cell density in such a range can increase the purification performance of the catalyst while reducing the pressure loss upon flowing of an exhaust gas. The cell density is a value obtained by dividing the number of cells by an area of one end face of the honeycomb structure portion 11 excluding the outer peripheral wall 12 portion.

The provision of the outer peripheral wall 12 of the honeycomb structure portion 11 is useful in terms of ensuring the structural strength of the honeycomb structure portion 11 and preventing a fluid flowing through the cells 18 from leaking from the outer peripheral portion 12. More particularly, the thickness of the outer peripheral wall 12 is preferably 0.1 mm or more, and more preferably 0.15 mm or more, and even more preferably 0.2 mm or more. However, if the outer peripheral wall 12 is too thick, the strength becomes too high, so that a strength balance between the outer peripheral wall 12 and the partition wall 19 is lost to reduce thermal shock resistance. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in the cross section perpendicular to the flow path direction of the cells.

The partition wall 19 may be porous. When the partition wall 19 is porous, the partition wall 19 preferably has a porosity of from 35 to 60%, and more preferably from 35 to 45%. The porosity is a value measured by a mercury porosimeter.

The partition wall 19 of the honeycomb structure portion 11 preferably has an average pore diameter of from 2 to 15 μm, and more preferably from 4 to 8 μm. The average pore diameter is a value measured by a mercury porosimeter.

(1-2. Electrode Layer)

The honeycomb structure 10 includes a pair of electrode layers 13*a*, 13*b* on an outer surface of the outer peripheral wall 12 across a central axis of the honeycomb structure portion 11 so as to extend in a form of a band in the flow path direction of the cells 18. By thus providing the pair of electrode layer 13*a*, 13*b*, uniform heat generation of the honeycomb structure portion 11 can be enhanced. It is desirable that each of the electrode layers 13*a*, 13*b* extends over a length of 80% or more, and preferably 90% or more, and more preferably the full length, between both end faces of the honeycomb structure portion 11, from the viewpoint that a current easily spreads in an axial direction of each of the electrode layers 13*a*, 13*b*.

Each of the electrode layers 13*a*, 13*b* preferably has a thickness of from 0.01 to 5 mm, and more preferably from 0.01 to 3 mm. Such a range can allow uniform heat generation to be enhanced. The thickness of each of the electrode layers 13*a*, 13*b* is defined as a thickness in a direction of a normal line to a tangential line at a measurement point on an outer surface of each of the electrode layers 13*a*, 13*b* when observing the portion of each electrode portion to be subjected to thickness measurement in the cross section perpendicular to the flow path direction of the cells 18.

The volume resistivity of each of the electrode layers 13*a*, 13*b* is lower than the volume resistivity of the honeycomb structure portion 11, whereby the electricity tends to flow preferentially to the electrode layers 13*a*. 13*b*, and the electricity tends to spread in the flow path direction and the circumferential direction of the cells 18 during electric conduction. The volume resistivity of the electrode layers 13*a*, 13*b* is preferably 1/10 or less, and more preferably 1/20 or less, and even more preferably 1/30 or less, of the volume resistivity of the honeycomb structure portion 11. However, if the difference in volume resistivity between both becomes too large, the current is concentrated between ends of the opposing electrode layers to bias the heat generated in the honeycomb structure portion 11. Therefore, the volume resistivity of the electrode layers 13*a*, 13*b* is preferably 1/200 or more, and more preferably 1/150 or more, and even more preferably 1/100 or more, of the volume resistivity of the honeycomb structure portion 11. As used herein, the volume resistivity of the electrode layers 13*a*, 13*b* is a value measured at 25° C. by a four-terminal method.

Each of the electrode layers 13*a*, 13*b* may be made of conductive ceramics, a metal, and a composite of a metal and conductive ceramics (cermet). Examples of the metal include a single metal of Cr, Fe, Co, Ni, Si or Ti, or an alloy containing at least one metal selected from the group consisting of those metals. Non-limiting examples of the conductive ceramics include silicon carbide (SiC), metal compounds such as metal silicides such as tantalum silicide ($TaSi_2$) and chromium silicide ($CrSi_2$). Specific examples of the composite of the metal and the conductive ceramics (cermet) include a composite of metal silicon and silicon carbide, a composite of metal silicide such as tantalum silicide and chromium silicide, metal silicon and silicon carbide, and further a composite obtained by adding to one or more metals listed above one or more insulating ceramics such as alumina, mullite, zirconia, cordierite, silicon nitride, and aluminum nitride, in terms of decreased thermal expansion. The electrode layers 13*a*, 13*b* may preferably be made of a combination of the metal silicide such as tantalum silicide and chromium silicide with the composite of metal silicon and silicon carbide, among the above various metals and conductive ceramics, for the reason that they can be produced simultaneously with the honeycomb structure portion 11, which will contribute to simplification of the production step.

(1-3. Slit)

The honeycomb structure 10 is provided with at least one slit 21 including a filling material layer 25 made of a filling material. The slit 21 may be provided only in the outer peripheral wall 12 of the honeycomb structure 10, or may be provided only in the cells 18, or the slits 21 may be provided in the outer peripheral wall 12 and the cells 18. It should be noted that providing the slit in the cells 18 means removing a part of the partition wall that defines the plurality of cells. Moreover, the slits 21 may be formed on the outer surface of the outer peripheral wall 12 of the honeycomb structure portion 11 and may be slits extending in a direction parallel to an axial direction of the honeycomb structure portion 10, or may be a slit formed on at least one of the end faces (the cells of the end faces), or both of them. Furthermore, as shown in FIG. 1, the slit 21 may be a slit that cuts the honeycomb structure portion 11 in a cross section parallel to the axial direction. Since the various slits 21 formed in the honeycomb structure 10 as described above functions to relax stress when the honeycomb structure 10 generates heat, it is possible to satisfactorily suppress the generation of cracks due to the generation of thermal expansion differences inside the honeycomb structure 10.

The shape and number of the slits 21 on the end face of the honeycomb structure 10 are not particularly limited and can be designed accordingly. For example, there may be one slit 21 or two or more slits 21 on the end face of the honeycomb structure 10, each of which may be formed so that they do not intersect with each other, or may be formed so that they at least partially intersect with each other. The length and width of each slit 21 on the end face of the honeycomb structure 10 are not particularly limited. The width of each slit 21 on the end face of the honeycomb structure 10 may be formed to be the same as the width of each cell 18, or the width of each slit 21 may be formed to be smaller or larger than that of each cell 18. The length of each slit 21 is not particularly limited, but it may be from 2 to 80 cells. The width of each slit 21 on the end face of the honeycomb structure 10 is not particularly limited, but it may be 1 to 5 cells. The length and width of each slit 21 on the end face of the honeycomb structure 10 can be designed appropriately depending on the size, material, applications, and number of slits 21 of the honeycomb structure 10.

Each slit 21 may be divided into sections along an extending direction of the slits 21 on the end face of the honeycomb structure 10. In this case, the slit 21 may be divided into slits having the same length or different lengths on the end face of the honeycomb structure 10. By dividing and forming the slit 21 on the end face of the honeycomb structure 10, the generation of cracks in the honeycomb structure 10 can be well controlled. The number of slits 21 divided is not particularly limited, but each slit 21 may be divided into two, three, or four or more sections. In addition, the honeycomb structure 10 may be provided with a plurality of slits consisting of the combination of divided slits and non-divided slits.

FIG. 1 schematically shows an embodiment where there is one slit 21 on the end face of the honeycomb structure 10. The slit 21 may extend so as to pass through the center as shown in FIG. 1 or so as not to pass through the center on the end face of the honeycomb structure 10. Specific examples of an embodiment where a plurality of slits 21 are formed are shown in FIGS. 2(A) to 2(H). It should be noted that each of FIGS. 2(A) to 2(H) only shows the outer diameter of one end face of the honeycomb structure 10 and the shape of the slits 21. All of them show the morphology at one end face of the honeycomb structure 10. These slits 21 may be formed only on one end face of the honeycomb structure 10, and may be formed to extend in the axial direction and penetrate to the other end face of the honeycomb structure 10 while maintaining a similar morphology in the cross section of the honeycomb structure 10.

Figures 2A, 2B, 2C, 2D, 2E, 2F, 2G, 2H:
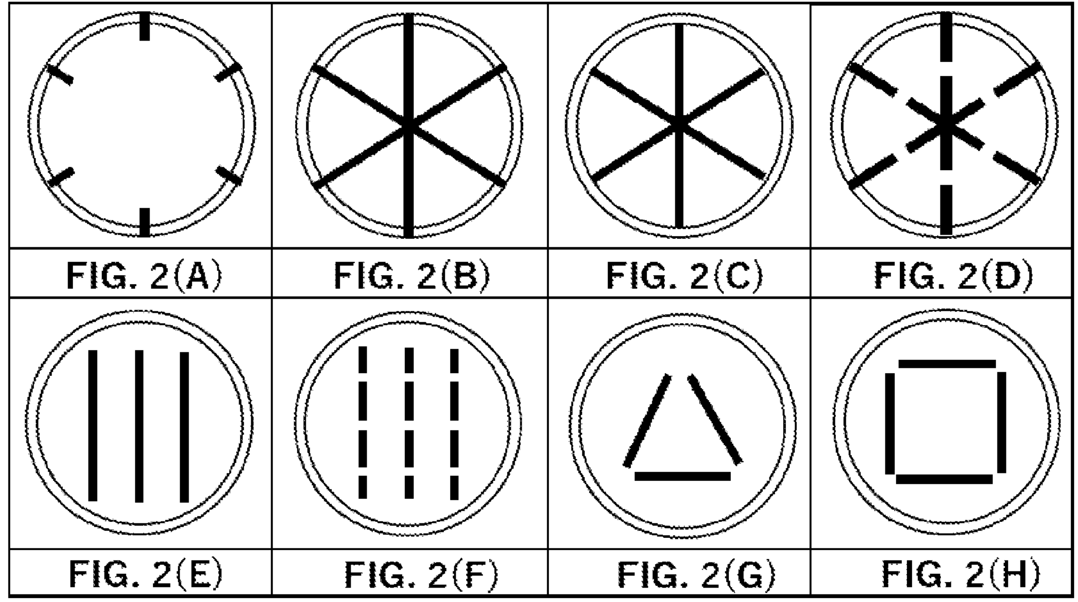
FIGS. 2 (A)-(H) are each schematic plane view of an end face in which slits of a honeycomb structure according to an embodiment of the present invention are formed.

As shown in FIG. 2(A), the slits 21 may be three sets of slits (six slits in total) in which the slits formed so as to extend from the outer peripheral wall into the partition wall by several cells on each end face of the honeycomb structure 10 face one another across the center of each end face of the honeycomb structure 10. Alternatively, as shown in FIG. 2(B), each end face of the honeycomb structure 10 may have three slits that intersect at the center and extend to the outer peripheral wall on both sides.

As shown in FIG. 2(C), the slits 21 may be formed on each end face of the honeycomb structure 10 so that the three slits as shown in FIG. 2(B) do not reach the inner peripheral end of the outer peripheral wall. Also, as shown in FIG. 2(D), each of the three slits as shown in FIG. 2(B) may be divided along the extending direction.

As shown in FIG. 2(E), the slits 21 may be three slits extending parallel to one another on the end face of the honeycomb structure 10. As shown in FIG. 2(F), each of the three slits shown in FIG. 2(E) may be divided along the extending direction.

As shown in FIG. 2(G), the slits 21 may be three slits, which form a substantially triangle where the slits do not intersect at their apexes, on the end face of the honeycomb structure 10. As shown in FIG. 2(H), the slits may also be four slits, which form a substantially square where the slits do not intersect at their apexes.

(1-4. Filling Material Layer)

A filling material layer 25 is included in each slit 21. The interior of one slit 21 may be entirely filled with the filling material layer 25, or the interior of each slit 21 may be partially filled with the filling material layer 25. From the viewpoint of thermal shock resistance of the honeycomb structure 10, it is more preferable that the interior of the slit 21 is entirely filled with the filling material layer 25.

When a plurality of slits 21 are provided, all the slits 21 may contain the filling material layer 25, or only a part of the slits 21 may contain the filling material layer 25. From the viewpoint of thermal shock resistance of the honeycomb structure 10, it is more preferable to provide all the slits 21 with the filling material layers 25.

A form where the filling material layer 25 is included in a part of the slits 21 may be a form where the filling material layer 25 is filled from one end face of the slit 21 to a predetermined depth, or a form where the filling material layer 25 having a predetermined thickness may be provided along the inner wall of the slit 21 from one end face to the other end face of the slit 21. When the filling material layer 25 having a predetermined thickness is provided along the inner wall of the slit 21, the thickness of the filling material layer 25 can be appropriately adjusted depending on the width of each slit 21. For example, it may be 500 to 5000 μm, or a width of 1 to 5 cells. In the form where the filling material layer 25 is provided from one end face to the other end face in the slit 21, the filling material layer 25 also functions as a gas sealing material that suppresses gas leakage from the slit 21.

The filling material layer 25 is made of a filling material. When the honeycomb structure portion 11 is mainly based on silicon carbide or a silicon carbide-metal silicon composite material, the filling material making up the filling material layer 25 preferably contains 20% by mass or more of silicon carbide, and even more preferably from 20 to 70% by mass of silicon carbide. This can allow a thermal expansion coefficient of the filling material to be close to that of the honeycomb structure portion 11, thereby improving the thermal shock resistance of the honeycomb structure 10. The filling material may contain 30% by mass or more of silica, alumina, or the like. As the filling material making up the filling material layer 25, plural kinds of filling materials may be used together. For example, the filling materials may be selectively used in one slit 21 depending on the positions, or they may be selectively used among the plurality of the slits 21.

The volume resistivity of the filling material is preferably 100 to 100,000% of that of the honeycomb structure portion 11. Moreover, the volume resistivity of the filling material is more preferably 200 to 100,000%, particularly preferably 300 to 100,000%, of that of the honeycomb structure portion 11. When the volume resistivity of the filling material is 100% of that of the honeycomb structure portion 11, it is difficult for the current to flow through the filling material, so that the current can easily and uniformly flow through the honeycomb structure portion 11. There is no particular problem even if the volume resistivity of the filling material is higher. The filling material may be an insulator. The upper limit of the volume resistivity of the filling material is actually about 100,000% of that of the honeycomb structure portion 11.

The filling material layer 25 has pores. The pores included in the filling material layer 25 may have a pore diameter of 1 to 500 μm, although not limited thereto. Among the pores contained in the filling material layer 25, the pores having a pore diameter of 90 μm or more account for 30% by volume or more of all the pores contained in the filling material layer 25. According to such a configuration, among the pores contained in the filling material layer 25, larger pores having a pore diameter of 90 μm or more has a higher volume ratio, so that cracks tend to be generated in the filling material layer 25 when stress is generated in the honeycomb structure 10. By thus positively generating cracks due to the presence of large-diameter pores in the filling material layer 25, the Young's modulus of the filling material layer 25 can be optimized, and the thermal stress generated near the slits 21 during EHC heating can be reduced, so that the thermal shock resistance of the honeycomb structure 10 can be improved. More preferably, pores having a pore diameter of 90 μm or more account for 40% by volume or more of all pores contained in the filling material layer 25. Even more preferably, pores having a pore diameter of 90 μm or more account for 50% by volume or more of all pores contained in the filling material layer 25. Further, if there are no pores having a diameter of less than 90 μm, the cracks in the filling material layer 25 are difficult to develop. Therefore, it is more preferable that pores having a pore diameter of 90 μm or more account for 90% by volume or less of all the pores contained in the filling material layer 25.

The pore diameter (μm) of each pore contained in the filling material layer 25 and the volume ratio of the pores having the predetermined pore diameter to all the pores contained in the filling material layer 25 can be measured by cross-sectional observation with SEM. More particularly, first, a sample for observing the cross section of the filling material layer 25 is cut out from the honeycomb structure having the slits containing the filling material layer, and the cross section is observed. If necessary, the irregularities of the cross section of the filling material layer 25 are filled with a resin, and then polished, and the polished surface (cross section) is observed. A cross-sectional area of each pore is calculated by image analysis of a SEM image at 100-fold magnifications obtained by observing an area (unit area) of 0.5 mmxl mm. Then, the pores are considered to be spheres, and the volume of each pore is estimated from an equivalent circle diameter of the cross-sectional area of any pore included in the unit area. Using the estimated volume of each pore, the volume ratio (% by volume) of the pores having the predetermined pore diameter to all pores contained in the filling material layer 25 in the unit area is calculated. This unit area is observed at four positions, and the volume ratio of the pores having the predetermined pore diameter is calculated in the same manner, and an average value at four positions is defined as the volume ratio (% by volume) of the pores having the predetermined pore diameter to all the pores contained in the filling material layer 25.

The filling material layer 25 preferably has a porosity of 20 to 90%. The porosity of the filling material layer 25 of 90% or less can sufficiently ensure the strength of the filling material layer 25, and prevent the filling material layer 25 from being collapsed to lose a gas leakage suppressing function. The porosity of the filling material layer 25 of 20% or more can sufficiently maintain the stress relaxation function of the slits without excessively increase the Young's modulus of the filling material layer 25. More preferably, the porosity of the filling material layer 25 is 30 to 85%, and even more preferably 45 to 75%. Here, even if the porosities of the filling material layers 25 are the same, as described above, the pore diameters (μm) of the pores and the volume ratios (% by volume) of the pores having the predetermined amount included in the filling material layer 25 to all the pores included in the filling material layer 25 are not necessarily the same. In the present invention, the porosity of the filling material layer 25 is not simply controlled, but among the pores contained in the filling material layer 25, the pores having the pore diameter of 90 μm or more are controlled to be 30% by volume or more of all the pores contained in the filling material layer 25, whereby, when the EHC generates heat and the thermal stress is generated around the slits, the pores having the pore diameter of 90 μm or more scattered in the filling material layer 25 are dispersed like perforations to preferentially generate cracks in the filling material layer 25, so that a stress buffering function can be exerted.

In the filling material layer 25, a pore diameter of D50 in a cumulative distribution on a volume basis is preferably 80 to 500 μm. The pore diameter of D50 in the filling material layer 25 of 80 μm or more can allow the pores scattered in the filling material layer 25 and having a pore diameter of 80 μm or more to be dispersed like perforations to preferentially generate cracks in the filling material layer 25 when the EHC generates heat and the thermal stress is generated around the slits, so that the stress buffering function can be exerted. The pore diameter of D50 in the filling material layer 25 of 500 μm or less results in a difficulty to collapse the filling material layer 25 even after cracks are generated in the filling material layer 25, so that the gas leakage suppressing effect is maintained. The pore diameter of D50 in the filling material layer 25 is more preferably 80 to 300 μm, and even more preferably 80 to 200 μm. The pore diameter of D50 in the cumulative distribution on a volume basis in the filling material layer 25 can be measured by cross-sectional observation with an SEM. Specifically, first, a sample for observing the cross section of the filling material layer 25 is cut out from the honeycomb structure provided with the slits containing the filling material layer, and the cross section is observed. If necessary, irregularities of the cross section of the filling material layer 25 is filled with a resin, and then polished to observe the polished surface (cross section). The cross-sectional area of each pore is calculated by image analysis of SEM images at 100-fold magnifications obtained by observing four regions each having 0.5 mmxl mm. Then, the equivalent circle diameters obtained from the cross-sectional area are determined to be the pore diameters, and the D50 is calculated from each pore diameter.

The filling material layer 25 preferably has a Young's modulus of 10 to 1000 MPa. The Young's modulus of the filling material layer 25 of 10 MPa or more leads to good mechanical strength of the honeycomb structure 10. The Young's modulus of the filling material layer 25 of 1000 MPa or less leads to better thermal shock resistance of the honeycomb structure 10. The Young's modulus of the filling material layer 25 is more preferably 20 to 500 MPa, and even more preferably 50 to 200 MPa, and particularly preferably 70 to 200 MPa. The Young's modulus of the filling material layer 25 can be calculated from the stress and strain at 20 to 50% stress loading in four-point bending strength measurement, as described in Japanese Patent No. 6259327 B.

The honeycomb structure portion 11 preferably has a Young's modulus of 1 to 100 GPa. The Young's modulus of 1 GPa or more of the honeycomb structure portion 11 leads to good mechanical strength of the honeycomb structure 10. The Young's modulus of 100 GPa or less of the honeycomb structure portion 11 leads to better thermal shock resistance of the honeycomb structure 10. The Young's modulus of the honeycomb structure portion 11 is more preferably 2 to 50 GPa, and even more preferably 5 to 20 GPa. The Young's modulus of the honeycomb structure portion 11 can be calculated from the stress and strain at a stress loading of 20 to 50% in four-point bending strength measurement.

(2. Electrically Heating Support)

Figure 3:
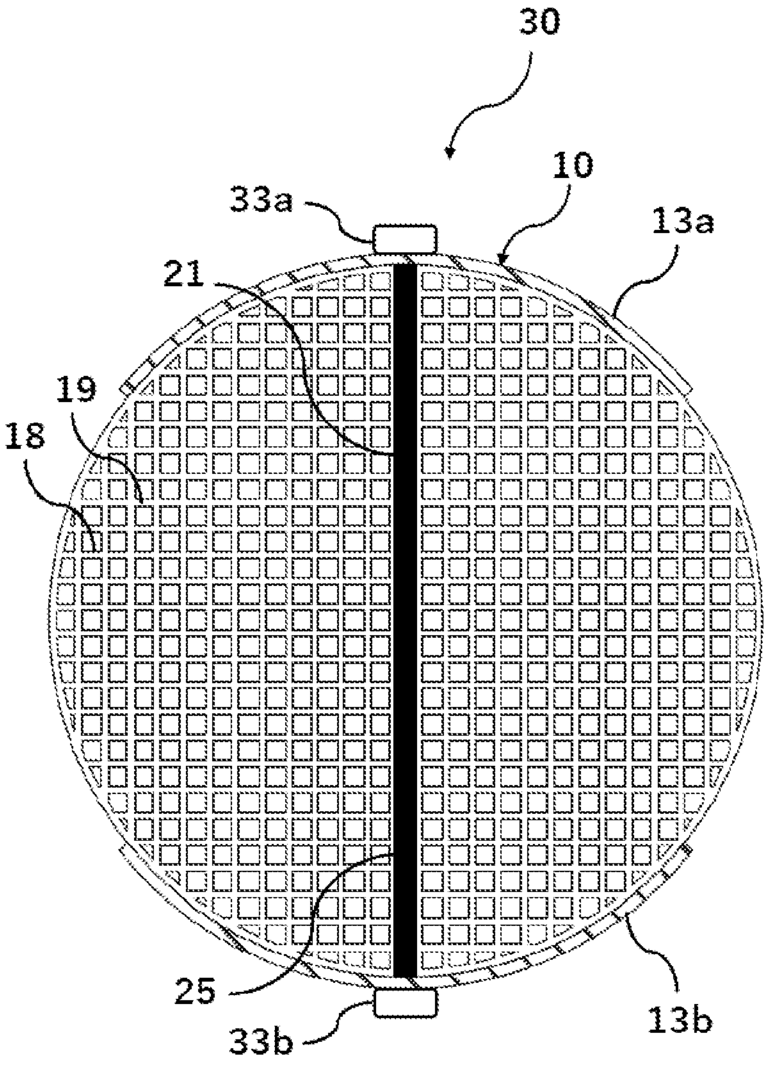
FIG. 3 is a schematic cross-sectional view of an electrically heating support according to an embodiment of the present invention, which is perpendicular to a flow path direction of cells.

FIG. 3 is a schematic cross-sectional view of an electrically heating support 30 according to an embodiment of the present invention, which is perpendicular to the flow path direction of the cells. The electrically heating support 30 includes: the honeycomb structure 10; and metal electrodes 33*a*, 33*b* electrically connected to the electrode layers 13*a*, 13*b* of the honeycomb structure 10, respectively.

(2-1. Metal Electrode)

The metal electrodes 33*a*, 33*b* are provided on the electrode layers 13*a*, 13*b* of the honeycomb structure 10. The metal electrode 33*a*, 33*b* may be a pair of metal electrodes such that one metal electrode 33*a* is disposed so as to face the other metal electrode 33*b* across the central axis of the honeycomb structure portion 11. As a voltage is applied to the metal electrodes 33*a*, 33*b* through the electrode layers 13*a*, 13*b*, then the electricity is conducted through the metal electrodes 33*a*, 33*b* to allow the honeycomb structure portion 11 to generate heat by Joule heat. Therefore, the electrically heating support 30 can also be suitably used as a heater. The applied voltage is preferably from 12 to 900 V, and more preferably from 64 to 600 V, although the applied voltage may be changed as needed.

The material of the metal electrodes 33*a*, 33*b* is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal electrodes 33*a*, 33*b* are not particularly limited, and they can be appropriately designed according to the size of the electrically heating support 30, the electrical conduction performance, and the like.

By supporting the catalyst on the electrically heating support 30, the electrically heating support 30 can be used as a catalyst. For example, a fluid such as an exhaust gas from a motor vehicle can flow through the flow paths of the plurality of cells 18 of the honeycomb structure 10. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a NOx storage reduction catalyst (LNT catalyst) containing an alkaline earth metal and platinum as storage components for nitrogen oxides ($NO_x$). Illustrative examples of a catalyst that does not use the noble metal include a NOx selective reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

(3. Method for Producing Honeycomb Structure)

Next, a method for producing the honeycomb structure according to an embodiment of the present invention will be described.

The method for producing the honeycomb structure according to an embodiment of the present invention includes: a forming step of preparing a honeycomb formed body; a drying step of preparing a honeycomb dried body; and a firing step of preparing a honeycomb fired body.

(Forming Step)

In the forming step, first, a forming raw material containing a conductive ceramic raw material is prepared. The forming raw material is prepared by adding metal silicon powder (metal silicon), a binder, a surfactant(s), a pore former, water, and the like to silicon carbide powder (silicon carbide). It is preferable that a mass of metal silicon is from 10 to 40% by mass relative to the total of mass of silicon carbide powder and mass of metal silicon. The average particle diameter of the silicon carbide particles in the silicon carbide powder is preferably from 3 to 50 μm, and more preferably from 3 to 40 μm. The average particle diameter of the metal silicon (the metal silicon powder) is preferably from 2 to 35 μm. The average particle diameter of each of the silicon carbide particles and the metal silicon (metal silicon particles) refers to an arithmetic average diameter on a volume basis when frequency distribution of the particle size is measured by the laser diffraction method. The silicon carbide particles are fine particles of silicon carbide forming the silicon carbide powder, and the metal silicon particles are fine particles of metal silicon forming the metal silicon powder. It should be noted that this is the composition of the forming raw material when the material of the honeycomb structure is the silicon-silicon carbide composite material, and when the material is silicon carbide, the metal silicon is not added.

Examples of the binder include methyl cellulose, hydroxypropylmethyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metal silicon powder is 100 parts by mass.

The content of water is preferably from 20 to 60 parts by mass when the total mass of the silicon carbide powder and the metal silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metal silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metal silicon powder is 100 parts by mass. An average particle diameter of D50 in a cumulative distribution on a volume basis of the pore former is preferably from 10 to 30 μm. When the pore former is the water absorbing resin, the average particle diameter of the pore former refers to an average particle diameter after water absorption.

The resulting forming raw material is then kneaded to form a green body, and the green body is then extruded to prepare a honeycomb structure. The honeycomb formed body includes: the outer peripheral wall; and the partition wall which is disposed on the inner side of the outer peripheral wall and defines the plurality of cells each extending from one end face to the other end face to form the flow path.

(Drying Step)

The resulting honeycomb formed body is then dried to produce a honeycomb dried body. The drying method is not particularly limited. Examples include electromagnetic wave heating methods such as microwave heating/drying and high-frequency dielectric heating/drying, and external heating methods such as hot air drying and superheated steam drying. Among them, it is preferable to dry a certain amount of moisture by the electromagnetic wave heating method and then dry the remaining moisture by the external heating method, in terms of being able to dry the entire formed body quickly and evenly without cracking. As for conditions of drying, it is preferable to remove 30 to 99% by mass of the water content before drying by the electromagnetic wave heating method, and then reduce the water content to 3% by mass or less by the external heating method. The dielectric heating/drying is preferable as the electromagnetic heating method, and hot air drying is preferable as the external heating method. The drying temperature may preferably be from 50 to 120° C.

At least one slit is then formed in the outer peripheral wall and/or the partition wall of the honeycomb dried body. The slit can be formed using a cutting tool or the like according to a general slit forming method. It should be noted that the slit may not be formed on the honeycomb dried body, and as described later, after the honeycomb dried body is fired to produce the honeycomb fired body, the slit may be formed on the honeycomb fired body. The shape, number of slits, number of intersections, length, and width of the slit can be designed as needed depending on the desired characteristics of the honeycomb structure to be produced, and the like.

(Firing Step)

The honeycomb dried body having the formed slits is then fired to produce a honeycomb fired body. As the firing conditions, the honeycomb dried body is preferably heated in an inert atmosphere such as nitrogen or argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

(Filling Step)

The slits of the honeycomb dried body or the honeycomb fired body are filled with a raw material for the filling material and dried to form the filling material layers. The filling material can be filled by a known method such as press-fitting with a spatula. The raw material for filling material is prepared by adding to an aggregate (such as silicon carbide), a binding material (such as metal silicon), a binder, a surfactant, a pore former, water, and the like.

The pore former used for the raw material for the filling material is not particularly limited as long as it will form pores after firing, and examples include graphite, starch, foaming resins, water absorbing resins, silica gel, and the like. The content of the pore former is preferably 0.1 to 20 parts by mass, and more preferably 1 to 15 parts by mass, when the total mass of the aggregate and the binding material is 100 parts by mass. The pore former preferably has an average particle diameter of 3 to 150 μm.

The average particle diameter of D50 in the cumulative distribution on the volume bass of the pore former is preferably 50 to 200 μm. When the pore former is the water absorbing resin, the average particle diameter of the pore former refers to an average particle diameter after water absorption. Further, the pore former may employ combinations of a plurality of relatively small pore formers having an average particle diameter of 3 to 90 μm and a plurality of relatively large pore former having an average particle diameter of more than 90 μm. The average particle diameter of the relatively large pore former is more preferably 100 μm or more. The formulated ratio (a ratio in part by mass) of these is preferably small pore former:large pore former=1.5:8.5 to 7:3.

From the viewpoint of workability when filling the slit with the raw material for filling material, the raw material for filling material preferably has a viscosity of 1 to 100 Pa·s.

The honeycomb dried body or honeycomb fired body in which the filling material has been provided in the slits is then heated to produce a honeycomb dried body or honeycomb fired body (honeycomb structure) including the slit provided with the filling material layer. The heating may preferably be carried out at 400 to 700° C. for 10 to 60 minutes. The heating (heat treatment) is carried out in order to strengthen a chemical bonding of the filling material. The heating method is not limited, and the firing may be carried out using an electric furnace, gas furnace, or the like.

As a method for producing a honeycomb structure having electrode layers, first, an electrode layer-forming raw material containing a ceramic raw material is applied to the side surface of the honeycomb dried body, and dried to form a pair of unfired electrode layers on the outer surface of the outer peripheral wall across the central axis of the honeycomb dried body so as to extend in a form of a band in the flow path direction of the cells, thereby producing a honeycomb dried body with unfired electrode layers. The honeycomb dried body with unfired electrode layers is then fired to produce a honeycomb fired body having a pair of electrode layers. The honeycomb structure having electrode layers is thus obtained. In addition, the electrode layers may be formed after the honeycomb fired body is produced. Specifically, once the honeycomb fired body is produced, a pair of unfired electrode layers may be formed on the honeycomb fired body, and fired to produce the honeycomb fired body with the pair of electrode layers.

The electrode layer-forming raw material can be formed by appropriately adding various additives to raw material powder (metal powder and/or ceramic powder, etc.) blended according to required properties of the electrode layers, and kneading the mixture.

The method of preparing the electrode layer-forming raw material and the method of applying the electrode layer-forming raw material to the honeycomb fired body can be carried out according to the known method for producing a honeycomb structure. In order to make the electric resistivity of the electrode layer lower than that of the honeycomb structure portion, a metal content ratio can be increased or a particle diameter of the metal particles can be decreased as compared with that of the honeycomb structure portion.

Before firing the honeycomb dried body with unfired electrode layers, degreasing may be performed to remove the binder and the like. The degreasing step is as described above.

(Firing Step)

The honeycomb dried body with unfired electrode layers is then fired to produce a honeycomb fired body. As the firing conditions, the honeycomb dried body is preferably heated in an inert atmosphere such as nitrogen and argon at 1400 to 1500° C. for 1 to 20 hours. Prior to the firing, degreasing may be carried out to remove the binder and the like. The degreasing step is carried out in an air atmosphere, an inert atmosphere, or a reduced pressure atmosphere at 400 to 500° C. After firing, an oxidation treatment is preferably carried out at 1200 to 1350° C. for 1 to 10 hours in order to improve durability. The method of firing is not particularly limited, and it can be carried out using an electric furnace, a gas furnace, or the like. The honeycomb structure 10 according to the embodiment of the present invention is thus obtained.

(4. Method for Producing Electrically Heating Support)

In one embodiment of the method for the electrically heating support 30 according to the present invention, the metal electrodes are fixed and electrically connected to the electrode layers on the honeycomb structure 10. Examples of the fixing method includes methods knowing the art such as laser welding, thermal spraying, and ultrasonic welding. More particularly, a pair of metal electrodes are provided on the outer surfaces of the electrode layers across the central axis of the honeycomb structure portion of the honeycomb structure 10. The electrically heating support 30 according to an embodiment of the present invention is thus obtained.

(5. Exhaust Gas Purification Device)

The electrically heating support 30 according to the above embodiment of the present invention can be used for an exhaust gas purification device. The exhaust gas purification device includes the electrically heating support 30 and a metallic cylindrical member for holding the electrically heating support 30. In the exhaust gas purification device, the electrically heating support 30 can be installed in an exhaust gas flow path for allowing an exhaust gas from an engine to flow. In the exhaust gas purification device, when the slit and the filling material are provided on the end face of the honeycomb structure portion 11, the end face is preferably provided on an upstream side of an exhaust gas flow. According to such a structure, the slit of the honeycomb structure is formed on the end face through which the higher-temperature exhaust gas passes, so that the thermal shock can be well mitigated and the generation of cracks can be better suppressed.

EXAMPLES

Hereinafter, Examples is illustrated for better understanding of the present invention and its advantages, but the present invention is not limited to these Examples.

Example 1

(1. Production of Green Body)

Silicon carbide (SiC) powder and metal silicon (Si) powder were mixed in a mass ratio of 80:20 to prepare a ceramic raw material. To the ceramic raw material were added hydroxypropylmethyl cellulose as a binder, a water absorbing resin as a pore former, and water to form a forming raw material. The forming raw material was then kneaded by means of a vacuum green body kneader to prepare a cylindrical green body. The content of the binder was 7 parts by mass when the total of the silicon carbide (SiC) powder and the metal silicon (Si) powder was 100 parts by mass. The content of the pore former was 3 parts by mass when the total of the silicon carbide (SiC) powder and the metal silicon (Si) powder was 100 parts by mass. The content of water was 42 parts by mass when the total of the silicon carbide (SiC) powder and the metal silicon (Si) powder was 100 parts by mass. The average particle diameter of the silicon carbide powder was 20 μm, and the average particle diameter of the metal silicon powder was 6 μm. The average particle diameter of the pore former was 20 μm. The average particle diameter of each of the silicon carbide powder, the metal silicon powder and the pore former refers to an arithmetic average diameter on a volume basis, when measuring frequency distribution of the particle diameter by the laser diffraction method.

(2. Production of Honeycomb Dried Body)

The resulting cylindrical green body was formed using an extruding machine having a grid-shaped die structure to obtain a cylindrical honeycomb formed body in which each cell has a hexagonal cross-sectional shape perpendicular to the flow direction of the cells. The honeycomb formed body was dried by high frequency dielectric heating, and then dried at 120° C. for 2 hours using a hot air dryer to produce a honeycomb dried body.

The slits were then formed in the honeycomb dried body by removing the partition wall so as to form the slits as shown in FIG. 1.

(3. Preparation and Application of Electrode Layer Forming Paste)

Metal silicon (Si) powder, silicon carbide (SiC) powder, methyl cellulose, glycerin, and water were mixed in planetary centrifugal mixer to prepare an electrode layer forming paste. The Si powder and the SiC powder were blended so that the volume ratio was Si powder:SiC powder=40:60. Further, when the total of the Si powder and the SiC powder was 100 parts by mass, methyl cellulose was 0.5 parts by mass, glycerin was 10 parts by mass, and water was 38 parts by mass. The average particle diameter of the metal silicon powder was 6 μm. The average particle diameter of the silicon carbide powder was 35 μm. The average particle diameter of each of those powders refers to an arithmetic average diameter on a volume basis when frequency distribution of particle diameters is measured by the laser diffraction method.

The electrode layer forming paste was then applied to the honeycomb dried body with an appropriate area and film thickness by a curved surface printing machine.

(4. Filling and Firing of Filling Material)

Next, the raw material for the filling material was prepared as follows. First, silicon carbide powder and silica powder (colloidal silica) were mixed at a mass ratio of 68:32 as a solid content. In this case, the mass of silica is a mass converted into an oxide ($SiO_2$). To this were added carboxymethyl cellulose as a binder, a pore former having an average particle diameter of 50 μm and a pore former having an average particle diameter of 150 μm, and glycerin as a moisturizing agent, and was added water and mixed together to obtain a mixture. The mixture was then kneaded to obtain a filling material-forming raw material. The binder content was 1.0 parts by mass when the total solid content of the silicon carbide powder and silica powder was 100 parts by mass. The content of the pore former having an average particle diameter of 50 μm was 7 parts by mass when the total solid content of the silicon carbide powder and silica powder was 100 parts by mass. The content of the pore former having an average particle diameter of 150 μm was 3 parts by mass when the total solid content of the silicon carbide powder and silica powder was 100 parts by mass. The D50 of the pore former on a volume basis was 80 μm. The glycerin content was 4 parts by mass when the total solid content of the silicon carbide powder and silica powder was 100 parts by mass. The content of water was 30 parts by mass when the total of the silicon carbide powder and silica powder was 100 parts by mass. The silicon carbide powder had an average particle diameter of 8 μm. The average particle diameter is a value measured by a laser diffraction method. The filling material-forming raw material was filled in the slits of the honeycomb dried body using a spatula.

It was further dried at 120° C. for 30 minutes in a hot air dryer, and then fired together with the honeycomb dried body in an Ar atmosphere at 1400° C. for 3 hours to obtain a cylindrical honeycomb structure in which the filling material layers were provided in the slits.

The honeycomb structure had circular end faces each having a diameter of 100 mm and had a height (the length of the cells in the direction of the flow path) of 100 mm. The cell density was 93 cells/$cm^2$, the thickness of the partition wall was 101.6 μm, the porosity of the partition wall was 45%, and the average pore diameter of the partition wall was 8.6 μm. The thickness of each electrode layer was 0.3 mm. The Young's modulus of the honeycomb structure was 5 GPa.

Table 1 shows the ratio of the pore volume having a pore diameter of 90 μm or more to the total pore volume in the filling material layers, the Young's modulus, the porosity, the pore diameter of D50 on a volume basis, and the content of each of the pore formers having an average particle diameter of 50 μm and an average particle diameter of 150 μm for the honeycomb structure according to Example 1. The pore former content shows a mass ratio (parts by mass) of the pore former when the total of the silicon carbide powder and silica powder contained in the filling material layers is 100 parts by mass.

The resulting honeycomb structure was subjected to a "Thermal Shock Resistance Test" by the method as shown below. The table shows the "Longitudinal Crack Generated Temperature" and the "End Face Crack Generated Temperature" as the results of the "Thermal Shock Resistance Test".

[Thermal Shock Resistance Test (Burner Test)]

A heating and cooling test of each honeycomb structure was carried out using "a propane gas burner tester including: a metal casing for housing the honeycomb structure; and a propane gas burner capable of feeding a heating gas into the metal casing". The heating gas was a combustion gas generated by burning a propane gas with a gas burner (propane gas burner). Then, the thermal shock resistance was evaluated by confirming whether or not cracks were generated in the honeycomb structure by the above heating and cooling test. Specifically, first, the resulting honeycomb structure was housed (canned) in the metal casing of the propane gas burner tester. The gas (combustion gas) heated by the propane gas burner was then fed into the metal casing so as to pass through the honeycomb structure. The temperature conditions (inlet gas temperature conditions) for the heating gas flowing into the metal casing were as follows. First, the temperature was increased to a designated temperature in 5 minutes, maintained at a designated temperature for 10 minutes, then cooled to 100° C. in 5 minutes, and maintained at 100° C. for 10 minutes. Such a series of operations of increasing, cooling, and maintaining the temperature is referred to as "heating and cooling operation". After that, cracks in the honeycomb structure were confirmed. The above "heating and cooling operation" was then repeated while increasing the designated temperature from 825° C. by 25° C. When the designated temperature was increased by 25° C. until cracks were generated in the sample, a temperature increase steepness increases, and the temperature increase of the outer peripheral portion is delayed with respect to that of the central portion, thereby increasing a temperature difference between the central portion and the outer peripheral portion to increase generated stress.

A honeycomb structure in which cracks were not generated until the designated temperature reached 850° C. was determined to be good for the thermal shock resistance test. In other words, if cracks were not generated at the designated temperature of 850° C., the honeycomb structure was good even if cracks were generated at a higher designated temperature, and if cracks were generated at less than the designated temperature of 850° C., the effect of the thermal shock resistance of the present invention was determined to be not obtained. In the thermal shock resistance test, whether or not the following two types of cracks were generated was confirmed. The first type of crack is called "Longitudinal Crack", and the second type of crack is called "End Face Crack". The "Longitudinal Crack" is a crack that is generated in the side surface of the honeycomb structure in the direction from the first end face to the second end face of the honeycomb structure. The "End Face Crack" is a crack that is generated on the end face of the honeycomb structure. The column of "Longitudinal Crack Generated Temperature" in Table 1 shows a temperature at which the generation of the longitudinal crack was observed. The column of "End Face Crack Generated Temperature" in Table 1 shows a temperature at which the generation of the end face crack was observed.

Examples 2 to 12, Comparative Examples 1 and 2

Each honeycomb structure was produced by the same method as that of Example 1, with the exception that each condition for the filling materials was changed as shown in Table 1. A "Thermal Shock Resistance test" was conducted by the same method as that of Example 1.

Table 1 shows the "Longitudinal Crack Generated Temperature" and "End Face Crack Generated Temperature" as the results of the "Thermal Shock Resistance Test".

TABLE 1

| | Filling Material Layer | | | | | | Thermal Shock Resistance Test Results | |
|---|---|---|---|---|---|---|---|---|
| | Ratio of Pore Volume with Pore Diameter of 90 μm or more to Total Pore Volume Contained in Filling Material Layer % | Young's Modulus MPa | Porosity % | Pore Diameter D50 μm | Pore Former Content (Average Particle Diameter 50 μm) Part by Mass | Pore Former Content (Average Particle Diameter 150 μm) Part by Mass | Longitudinal Crack Generated Temperature ° C. | End Face Crack Generated Temperature ° C. |
| Ex. 1 | 30 | 70 | 65 | 81 | 7 | 3 | 850 | 900 |
| Ex. 2 | 35 | 78 | 65 | 83 | 6.5 | 3.5 | 850 | 900 |
| Ex. 3 | 40 | 89 | 65 | 86 | 6 | 4 | 875 | 900 |
| Ex. 4 | 45 | 99 | 65 | 88 | 5.5 | 4.5 | 875 | 925 |
| Ex. 5 | 50 | 111 | 65 | 90 | 5 | 5 | 900 | 925 |
| Ex. 6 | 55 | 123 | 65 | 93 | 4.5 | 5.5 | 950 | 925 |
| Ex. 7 | 60 | 135 | 65 | 94 | 4 | 6 | 1000 | 950 |
| Ex. 8 | 65 | 146 | 65 | 95 | 3.5 | 6.5 | 975 | 975 |
| Ex. 9 | 70 | 157 | 65 | 96 | 3 | 7 | 1000 | 950 |
| Ex. 10 | 75 | 169 | 65 | 96 | 2.5 | 7.5 | 975 | 975 |
| Ex. 11 | 80 | 179 | 65 | 96 | 2 | 8 | 950 | 975 |
| Ex. 12 | 85 | 190 | 65 | 97 | 1.5 | 8.5 | 950 | 975 |
| Comp. 1 | 20 | 45 | 65 | 78 | 8 | 2 | 825 | 875 |
| Comp. 2 | 25 | 57 | 65 | 78 | 7.5 | 2.5 | 825 | 900 |

(Evaluation Results)

As shown in Table 1, in each of the honeycomb structures according to Examples 1 to 12, both the "Longitudinal Crack Generated Temperature" and the "End Face Crack Generated Temperature" were 850° C. or more, indicating that it had improved thermal shock resistance. On the other hand, in each of the honeycomb structures of Comparative Examples 1 and 2, at least one of the "Longitudinal Crack Generated Temperature" and the "End Face Crack Generated Temperature" was less than 850° C., indicating that it had poor thermal shock resistance. It was found from the above results that the filling material layers filled in the slits of the honeycomb structure had pores, and the pores having a pore diameter of 90 μm or more accounted for 30% by volume or more of all the pores contained in the filling material layers, thereby suppressing the generation of the cracks at an elevated temperature.

DESCRIPTION OF REFERENCE NUMERALS

10 honeycomb structure
11 honeycomb structure portion
12 outer peripheral wall
13*a*, 13*b* electrode layer
18 cell
19 partition wall
21 slit
25 Filling Material Layer

30 electrically heating support

33*a*, 33*b* metal electrode

The invention claimed is:

1. A honeycomb structure, comprising:

a honeycomb structure portion comprising: an outer peripheral wall; a partition wall disposed on an inner side of the outer peripheral wall, the partition wall defining a plurality of cells, each of the cells extending from one end face to other end face to form a flow path, wherein the outer peripheral wall and/or the cells comprise at least one slit containing a filling material layer made of a filling material, wherein the filling material layer has pores, and wherein the pores having a pore diameter of 90 μm or more account for 30% by volume or more of all the pores contained in the filling material layer.

2. The honeycomb structure according to claim 1, wherein the filling material layer has a Young's modulus of 10 to 1000 MPa.

3. The honeycomb structure according to claim 1, wherein the honeycomb structure portion has a Young's modulus of 1 to 100 GPa.

4. The honeycomb structure according to claim 1, wherein the slit is formed on an outer surface of the outer peripheral wall of the honeycomb structure portion, the slit extending in a direction parallel to an axial direction of the honeycomb structure and/or being formed on at least one of the end faces of the honeycomb structure portion.

5. The honeycomb structure according to claim 1, further comprising a pair of electrode layers provided on an outer surface of the outer peripheral wall so as to extend in a form of a band in a flow path direction of the cells across a central axis of the honeycomb structure portion.

6. An electrically heating support comprising:

the honeycomb structure according to claim 1;

a pair of electrode layers provide on an outer surface of the outer peripheral wall; and metal electrodes electrically connected to the pair of electrode layers.

7. An exhaust gas purification device, comprising:

the electrically heating support according to claim 6; and a metallic cylindrical member for holding the electrically heating support.

8. A honeycomb structure, comprising:

a honeycomb structure portion comprising: an outer peripheral wall; a partition wall disposed on an inner side of the outer peripheral wall, the partition wall defining a plurality of cells, each of the cells extending from one end face to other end face to form a flow path, wherein the outer peripheral wall and/or the cells comprise at least one slit containing a filling material layer made of a filling material, wherein the filling material layer has pores, wherein the pores having a pore diameter of 90 μm or more account for 30% by volume or more of all the pores contained in the filling material layer, and wherein the filling material layer has a pore diameter of D50 in a cumulative distribution on a volume basis of 80 to 500 μm.

* * * * *